No. 863,680.  
PATENTED AUG. 20, 1907.  
E. P. WARNER.  
POWER TRANSMISSION DEVICE.  
APPLICATION FILED NOV. 3, 1906.

2 SHEETS—SHEET 1.

Witnesses  
Inventor  
Edward Percy Warner  
By Frank D. Thomason  
Atty.

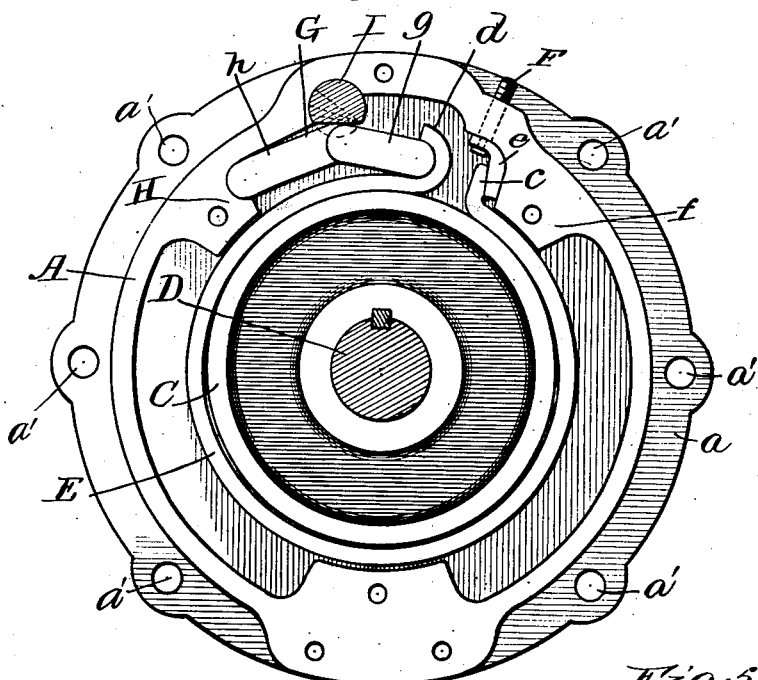
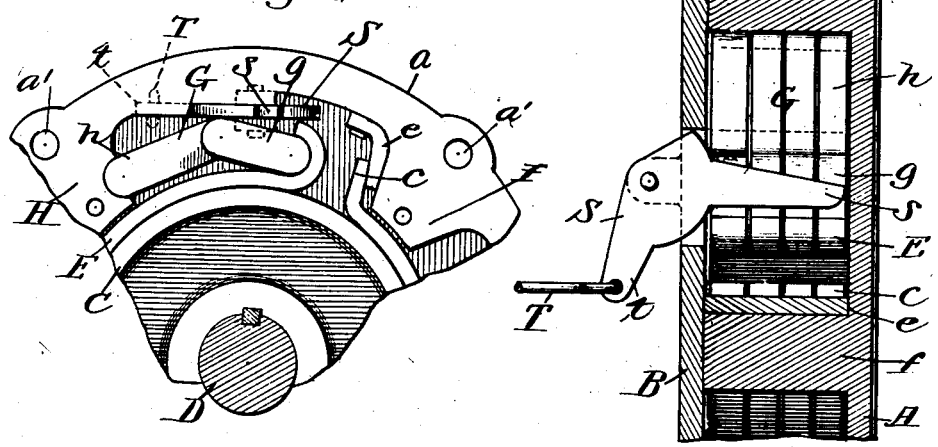

UNITED STATES PATENT OFFICE.

EDWARD PERCY WARNER, OF CHICAGO, ILLINOIS, ASSIGNOR, BY MESNE ASSIGNMENTS, TO WARNER CLUTCH COMPANY, A CORPORATION OF ILLINOIS.

POWER-TRANSMISSION DEVICE.

No. 863,680.      Specification of Letters Patent.      Patented Aug. 20, 1907.

Application filed November 3, 1906. Serial No. 341,921.

*To all whom it may concern:*

Be it known that I, EDWARD PERCY WARNER, a citizen of the United States, and a resident of Chicago, in the county of Cook and State of Illinois, have invented certain new and useful Improvements in Power-Transmission Devices, of which the following is a clear, full, and exact description.

One great objection to the means now extensively used for transmitting the motion of a drive-shaft to a driven shaft, as, for example, in automobiles, is due to the fact that the connection is made from devices revolving at full speed to devices at a standstill, and thus causes such a sudden strain upon the engaging parts as to greatly weaken them and increase their liability to break, as well as cause injury to the mechanism connected therewith.

My invention relates to such transmission devices, and its object is to apply the power or to release the power from the driven mechanism gradually, according as desired, so as to avoid the sudden strain upon the immediate transmission mechanism, and the shock and jar to the mechanism connected therewith.

A further object is to obtain, with the least manual effort, the greatest power for controlling the engaging elements of said transmitting devices, and yet a further object is to provide means for correctly and properly adjusting the engaging elements and taking up the wear thereof. This I accomplish by the means hereinafter fully described and as particularly pointed out in the claims.

Figure 1:
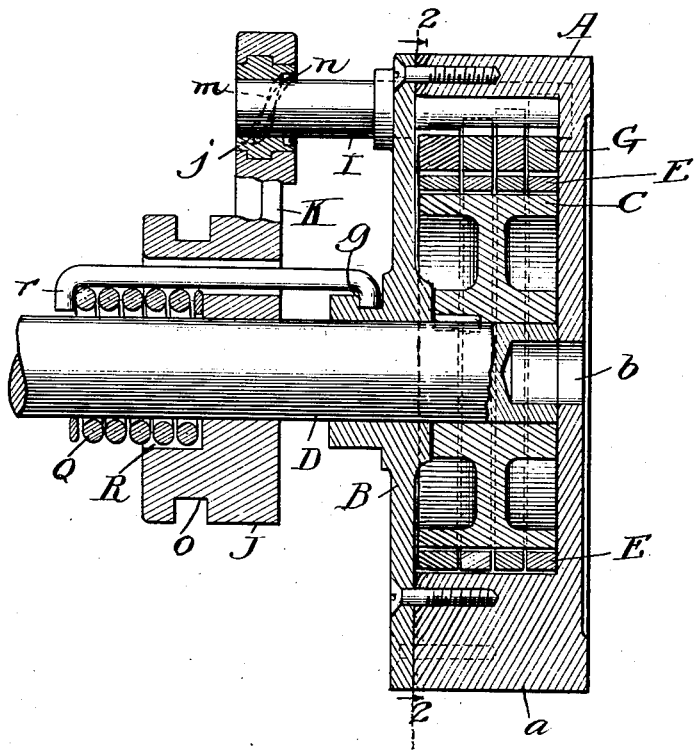
Figure 3:
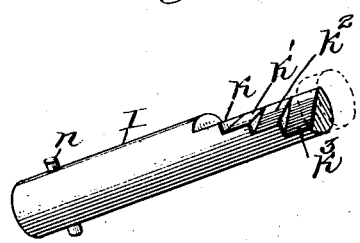

In the drawings:—Figure 1 is a longitudinal central section of my improved transmitting devices. Fig. 2 is a transverse section taken on dotted line 2, 2, Fig. 1. Fig. 3 is a detail view showing the rotatable spindle in perspective. Fig. 4 is a view similar to that shown in Fig. 2 of a portion of my invention showing modified means for straightening the toggles. Fig. 5 is a plan view of what is shown in Fig. 4, with the casing in horizontal section.

Referring to the drawings A represents a substantially circular casing, closed on one side, and open on the other so as to permit access to its interior by simply removing a head B therefrom. The circumferential edge $a$ of the closed side of the casing is slightly greater than that of the circular walls thereof, and is provided with bolt or rivet-holes $a'$, $a'$, therein, for the reception of bolts or rivets (not shown) for securing said casing to the shafting or other concentric element revoluble therewith. Placed concentrically within and inclosed by this casing is a circular drum C, which is keyed or otherwise secured to a shaft D extending, in alinement with the axis of the casing, from the closed side thereof out through the open side of the same. The end of this shaft, next the closed end of the casing and likewise the center of the casing is provided with an axial opening $b$, for the reception of the pilot-shaft (not shown) of the mechanism to which said casing may be secured.

The circumference of the head B conforms to that of the circumferential walls of the casing, and is secured to the same by bolts or screws, substantially as shown, and said head is provided with a suitable boss which is loosely journaled on the shaft D. Surrounding the cylindrical circumference of the drum C is a series of separate substantially circular bands E, which are of such width that a given number of them will practically envelop the circumference of the drum without interfering with one another. The ends $c$, $d$, of these bands are bent upwards. Ends $c$ remain stationary when said bands are consecutively made to engage the circumference of the drum, and are engaged by the wedge-shaped ends of the substantially L-shaped keys $e$, which extend between said ends $c$ and the inclined side of a lug $f$ projecting inwards from the inner circumference of the circular walls of the casing. In order that the bands when adjusted or when their other ends are engaged so as to make them clutch the drum, may be forced toward the circumference of the drum, I bevel the side of the outturned end $c$ facing lug $f$ and I taper the engaging end of the key. The ends of these keys farthest from the end $c$ of the band are suitably secured to or made integral with the inner ends of setscrews F tapped rigidly through the circular wall of the casing so that they may be manipulated from the outside to move said keys inwards or outwards to properly adjust the bands E to the drum. The inner circumference of these bands is slightly greater than the outer circumference of the drum, and the ends $d$ thereof are each curved outwards in such manner as to form a curved seat or socket for the reception of the rounded adjacent end of one of the links $g$ of the toggle G; and the other end of the link $g$ is likewise rounded and articulates with the socket in the adjacent end of the link $h$ to form a knee or knuckle. The opposite end of link $h$ is rounded and is seated in a suitable socket made in the adjacent side of a lug H projecting inwards from the inner circumference of the circular walls of the casing A, substantially as shown. The bend or angle of the knees of these toggles G points outwards, and are each engaged by means which press said knees inward and force said ends $d$ toward the ends $c$ of said bands, and thus take up the excess circumference and tighten the clamps upon the circumference of the drum. There are four of these bands E shown in the drawings, and they are all, preferably, of the same dimensions, except the one next the head B, which is shown to be slightly wider than the others. Each of these bands is engaged by a different key $e$ and a different toggle G each of which correspond with the other of its kind except as to the width, in which respect it is made to correspond with the width of the band engaged thereby.

The means employed by me for causing the engagement of, first, the band E next the head B, and then the second, the third and fourth one, independently of each other and in the order intimated, consists of a cylindrical spindle, I, which is journaled in suitable bearings in the closed end of the casing and in head B, with its axis parallel to that of shaft D, and extends a suitable distance outside of its bearings in said head. Within the casing this spindle is provided in the same transaxial plane with the first band nearest head B and the knuckle of the toggle, with a recess $k$, the bottom of which forms a straight engaging surface, which will be in the plane of the chord intersecting the ends of said recess, so that, when said spindle is rocked, the engagement of the bottom of said recess $k$ with the knuckle of the toggle will depress the same and cause a corresponding straightening of the toggle, and, consequently, force the end $d$ of the band toward the end $c$, and cause it to clutch the circumference of the drum C. The side of the spindle, in the same transaxial plane as the second band from the head B, is likewise provided with a recess $k'$, which is deeper than the recess $k$, and is made so that the end thereof nearest the end $d$ of the band will aline with the adjacent end of recess $k$. The bottom of this recess $k'$ is in the same plane as the chord intersecting its ends, and, as it is deeper than recess $k$, it will not engage the knuckle of the toggle actuating the said second band, until after the first band has clutched the drum. There is a third recess $k^2$ in the side of the spindle, which is deeper than recess $k'$ and the fourth recess $k^3$ which is deeper than recess $k^2$. The ends of all these recesses, contiguous to the ends $d$ of the bands aline, and as their engaging surfaces are in the plane of the chord intersecting their ends, the toggle actuating the third band will be depressed after the toggle actuating the second band, and the toggle actuating the fourth or last band will be depressed after the third. This engagement of the circumference of the drum by the bands successively, gradually imparts the revolving motion of the casing to the drum, providing the latter is the driven element. The strength of the grip of the first band will be insufficient to impart the full motion of the casing to the drum, and it will slip to a greater or less extent, but when the second band is clamped upon the drum, the friction between the second band and the drum being greater, will result in less slipping, and when the third band is applied there will be practically no slipping, and when the fourth band is applied there will be a positive clamping of the bands upon the drum, and the full motion of the casing will be imparted to the drum and to the shaft D. If the shaft D is the driving element, the operation of the bands upon the circumference of the drum will be the same, except that, in the latter case, the drum will slip against the inner circumference of the band instead of, as in the former case, the band slipping upon the drum.

In order to turn spindle I, to bring the bands E into successive engagement with the drum, I place a sleeve J loosely on shaft D opposite head B, and provide the same with a radially projecting arm K, which latter is provided with a suitable inserted bearing $j$, through which the extension of spindle I passes. The bore of this bearing is provided with a spiral groove $m$, that is engaged by a pin $n$ projecting from the spindle in such manner, that, when the sleeve J is moved toward the casing, the spindle is turned to an extent corresponding to the extent of the circle described by the groove. Sleeve J is, preferably, provided with a circumferential groove $o$ and is engaged and reciprocated by suitable means. It is kept normally pressing toward the casing by one or more links $r$ extending longitudinally through suitable openings parallel to shaft D, with their inner ends bent toward said shaft and seated in the suitable radial holes $g$ in the circumference of the boss of head B, and with their opposite end bent to form hooks that engage the adjacent end of a coil expansion spring Q, whose opposite end enters an annular recess R, substantially as shown.

In Figs. 4 and 5, I show modified means for straightening toggles G. This consists of a bell-crank S, which is pivoted between suitable lugs projecting from head B, and has one arm $s$ entering transversely into the case through a suitable opening, and the other arm $t$ extending substantially at right angles thereto, and has its end connected by a link T to arm K of sleeve J. Arm $s$ of this bell-crank passes between the inner circumference of the case and the toggles, and normally it is between links $h$ of said toggles and the case; when, therefore, sleeve J is moved towards the case, arm $s$, moving in the line of a circular course struck from its pivot will engage, first, the toggle nearest its pivot, then the next toggle, and so on, and, through the toggles successively bring the bands into engagement with the drum, in the manner hereinbefore explained.

What I claim as new is:—

1. A power transmission device comprising a revolving driving member, and a revolving driven member whose axes aline, a series of two or more independent and disconnected circumferential bands connected to one of said members, and means for causing said bands *seriatim*, to frictionally engage the other member.

2. A power transmission device comprising a revolving driving member, and a revolving driven member whose axes aline, a series of two or more independent and disconnected circumferential bands connected at one end in substantially transverse alinement to one of said members, and means for causing said bands *seriatim*, to frictionally engage the other member.

3. A power transmission device comprising a revolving driving member, and a revolving driven member whose axes aline, a series of two or more independent and disconnected circumferential bands adjustably connected to one of said members, and means for causing said bands *seriatim*, to frictionally engage the other member.

4. A power transmission device comprising a revolving driving member, and a revolving driven member whose axes aline, a series of two or more independent and disconnected circumferential bands adjustably connected at one end in substantially transverse alinement to one of said members, and means for causing said bands *seriatim*, to frictionally engage the other member.

5. A power transmission device comprising a revolving driving member and a revolving driven member whose axes aline, a series of independent circumferential bands, devices connected to one of said members for retaining one end of each of said bands in a fixed position, and means engaging the other end of said bands one after the other to cause said bands to frictionally engage the other member.

6. A power transmission device comprising a revolving driving member and a revolving driven member whose axes aline, a series of independent circumferential bands, devices connected to one of said members for adjustably retaining one end of each of said bands in a fixed position, and means engaging the other end of said bands one after the other to cause said bands to frictionally engage the other member.

7. A power transmission device comprising a revolving driving member and a revolving driven member whose axes aline, a series of separate bands each separately connected at one end to one of said members, and a toggle for engaging the other end of each of said bands and means for straightening said toggles one at a time and causing said bands to successively engage the other revolving member.

8. A power transmission device comprising a revolving driving member and a revolving driven member whose axes aline, a series of separate bands each separately connected at one end to one of said members, and a toggle for engaging the other end of each of said bands and means for engaging the knee and straightening said toggles one at a time and causing said bands to successively engage the other revolving member.

9. A power transmission device comprising a revolving driving member, and a revolving driven member whose axes aline, a series of two or more independent and disconnected circumferential bands of corresponding length connected to one of said members, and means for causing said bands, *seriatim*, to frictionally engage the other member.

10. A power transmission device comprising a revolving driving member, and a revolving driven member whose axes aline, a series of two or more independent and disconnected circumferential bands of corresponding length connected at one end in transverse alinement to one of said members, and means for causing said bands, *seriatim*, to frictionally engage the other member.

11. A power transmission device comprising a revolving driving member and a revolving driven member whose axes aline, a series of independent crrresponding circumferential bands, devices connected to one of said members for adjustably retaining one end of each of said bands in a fixed position, and means engaging the other ends of said bands one after the other to cause said bands to frictionally engage the other member.

12. A power transmission device comprising a suitable case, an independent shaft concentrically entering said case, a drum on said shaft within the case, a series of independent circumferential bands interposed between the circumferential wall of said case and the circumference of said drum, one end of which is anchored to said case, and means engaging the other ends of said bands, one after the other, to cause said bands to frictionally engage said drum.

13. A power transmission device comprising a suitable case, an independent shaft concentrically entering said case, a drum on said shaft within the case, a series of independent circumferential bands interposed between the circumferential wall of said case and the circumference of said drum one end of which is adjustably anchored to said case, and means engaging the other ends of said bands, one after the other, to cause said bands to frictionally engage said drum.

14. A power transmission device comprising a suitable case, an independent shaft concentrically entering said case, a drum on said shaft within the case, a series of independent circumferential bands having one end turned outwardly, devices connected with said case for engaging said outwardly turned ends, and adjusting said bands, and means for engaging the other ends of said bands, one after the other, to cause said bands to frictionally engage said drum.

15. A power transmission device comprising a suitable case having an inwardly projecting lug, an independent shaft concentrically entering said case, a drum on said shaft within the case, a series of independent circumferential bands having one end turned outwards, a substantially radially adjustable key interposed between said lug and the outturned end of each of said bands, and means for engaging the other end of said bands one after the other, to cause them to frictionally engage said drum.

16. A power transmission device comprising a suitable case having an inwardly projecting lug, an independent shaft concentrically entering said case, a drum on said shaft within the case, a series of independent circumferential bands having one end turned outwards and beveled on the side next said lug, a substantially radially adjustable tapered key interposed between said lug and the outturned end of each of said bands, and means for engaging the other end of said bands one after the other, to cause them to frictionally engage said drum.

17. A power transmission device comprising a suitable case having an inwardly projecting lug, an independent shaft concentrically entering said case, a drum on said shaft within the case, a series of independent circumferential bands having one end turned outwards, a substantially radially adjustable key interposed between said lug and the outturned end of each of said bands, radially disposed set-screws each adapted to engage the outer portion of one of said keys, and means for engaging the other end of said bands one after the other, to cause them to frictionally engage said drum.

18. A power transmission device comprising a suitable case having an inwardly projecting lug, an independent shaft concentrically entering said case, a drum on said shaft within the case, a series of independent circumferential bands having one end turned outwards and beveled on the side next said lug, a substantially radially adjustable tapered key interposed between said lug and the outturned end of each of said bands, radially disposed set-screws each adapted to engage the outer portion of one of said keys, and means for engaging the other end of said bands one after the other, to cause them to frictionally engage said drum.

19. A power transmission device comprising a suitable case having an inwardly projecting lug, an independent shaft concentrically entering said case, a drum on said shaft within the case, a series of independent circumferential bands each having one end turned outwards, a series of independent toggles one link of each of which articulates with the outturned ends of said bands, and the opposite end of the other link of each of which is seated in a suitable socket in said lug, and means for engaging the knuckles of said toggles one after the other.

20. A power transmission device comprising a suitable case having an inwardly projecting lug, an independent shaft concentrically entering said case, a drum on said shaft within the case, a series of independent circumferential bands each having one end turned outwards, a series of independent toggles consisting of two removably articulated links, one link of each, of which articulates with the outturned ends of said bands, and the opposite end of the other link of each of which is seated in a suitable socket in said lug, and means for engaging the knuckles of said toggles one after the other.

21. A power transmission device comprising a suitable case, an independent shaft concentrically entering said case, a drum on said shaft within said case, a series of independent circumferential bands, a series of independent toggles adapted to engage one end of said bands, and a rotatable spindle having a series of stepped recesses and adapted to engage said knuckles, one after the other.

In testimony whereof I have hereunto set my hand and seal this 30th day of October, A. D. 1906.

EDWARD PERCY WARNER. [L. S.]

Witnesses:
M. G. STOLL,
E. K. LUNDY.